United States Patent
Adachi

(10) Patent No.: US 9,629,068 B2
(45) Date of Patent: Apr. 18, 2017

(54) COMMUNICATION CONTROL METHOD, MOBILITY MANAGEMENT DEVICE, HOME BASE STATION, AND BASE STATION

(71) Applicant: KYOCERA CORPORATION, Kyoto-shi, Kyoto (JP)

(72) Inventor: Hiroyuki Adachi, Kanagawa (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/199,884

(22) Filed: Jun. 30, 2016

(65) Prior Publication Data

US 2016/0316417 A1   Oct. 27, 2016

Related U.S. Application Data

(63) Continuation of application No. 14/384,794, filed as application No. PCT/JP2013/057517 on Mar. 15, 2013, now Pat. No. 9,414,299.

(Continued)

(51) Int. Cl.
*H04W 48/04* (2009.01)
*H04W 36/00* (2009.01)
(Continued)

(52) U.S. Cl.
CPC ........... *H04W 48/04* (2013.01); *H04W 8/186* (2013.01); *H04W 12/06* (2013.01);
(Continued)

(58) Field of Classification Search
CPC ....... H04W 12/06; H04W 60/04; H04W 8/26; H04W 36/08; H04W 36/14; H04W 36/30;
(Continued)

(56) References Cited

U.S. PATENT DOCUMENTS

2006/0140196 A1  6/2006  Tanaka et al.
2007/0293224 A1  12/2007  Wang et al.
(Continued)

FOREIGN PATENT DOCUMENTS

EP   2509362 A1   10/2012
JP   2003-259417 A   9/2003
(Continued)

OTHER PUBLICATIONS

3GPP TS 36.300 V11.0.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Valbonne—France, 2011, pp. 1-194.

(Continued)

*Primary Examiner* — Leon-Viet Nguyen
(74) *Attorney, Agent, or Firm* — Hauptman Ham, LLP

(57) ABSTRACT

A communication control method applied to a mobile communication system, the mobile communication system including a home base station that forms a specific cell and a mobility management device that performs verification of a user terminal for access permission to the specific cell in a handover procedure of the user terminal to the specific cell, comprises a step A of transmitting, by the mobility management device, verification failure information indicating failure of the verification to the home base station when the verification is failed after the user terminal establishes a connection to the specific cell in the handover procedure and a step B of starting, by the home base station, a re-handover procedure of the user terminal to another cell from the specific cell while maintaining the connection in response to reception of the verification failure information from the mobility management device.

3 Claims, 13 Drawing Sheets

Related U.S. Application Data

(60) Provisional application No. 61/612,055, filed on Mar. 16, 2012.

(51) Int. Cl.
| | | |
|---|---|---|
| *H04W 12/06* | (2009.01) | |
| *H04W 36/04* | (2009.01) | |
| *H04W 40/36* | (2009.01) | |
| *H04W 60/06* | (2009.01) | |
| *H04W 8/18* | (2009.01) | |
| H04W 88/08 | (2009.01) | |
| H04W 88/12 | (2009.01) | |
| H04W 84/04 | (2009.01) | |

(52) U.S. Cl.
CPC ... *H04W 36/0055* (2013.01); *H04W 36/0077* (2013.01); *H04W 36/0083* (2013.01); *H04W 36/04* (2013.01); *H04W 40/36* (2013.01); *H04W 60/06* (2013.01); *H04W 84/045* (2013.01); *H04W 88/08* (2013.01); *H04W 88/12* (2013.01)

(58) Field of Classification Search
CPC .. H04W 36/0083; H04W 88/14; H04W 92/02
See application file for complete search history.

(56) References Cited

U.S. PATENT DOCUMENTS

| | | |
|---|---|---|
| 2011/0250892 A1 | 10/2011 | Gupta et al. |
| 2013/0017834 A1* | 1/2013 | Han ............... H04W 36/0083 455/437 |
| 2013/0153298 A1 | 6/2013 | Pietraski et al. |
| 2014/0029541 A1* | 1/2014 | Jung ................. H04L 5/0096 370/329 |

FOREIGN PATENT DOCUMENTS

| | | |
|---|---|---|
| JP | 2004-147228 A | 5/2004 |
| JP | 2007-74180 A | 3/2007 |
| WO | 2011/068213 A1 | 6/2011 |

OTHER PUBLICATIONS

International Search Report in International Application No. PCT/JP2013/057517, mailed Jun. 4, 2013.
Partial Supplementary European Search Report in EP Application No. 13760658.8, dated Nov. 16, 2015.

* cited by examiner

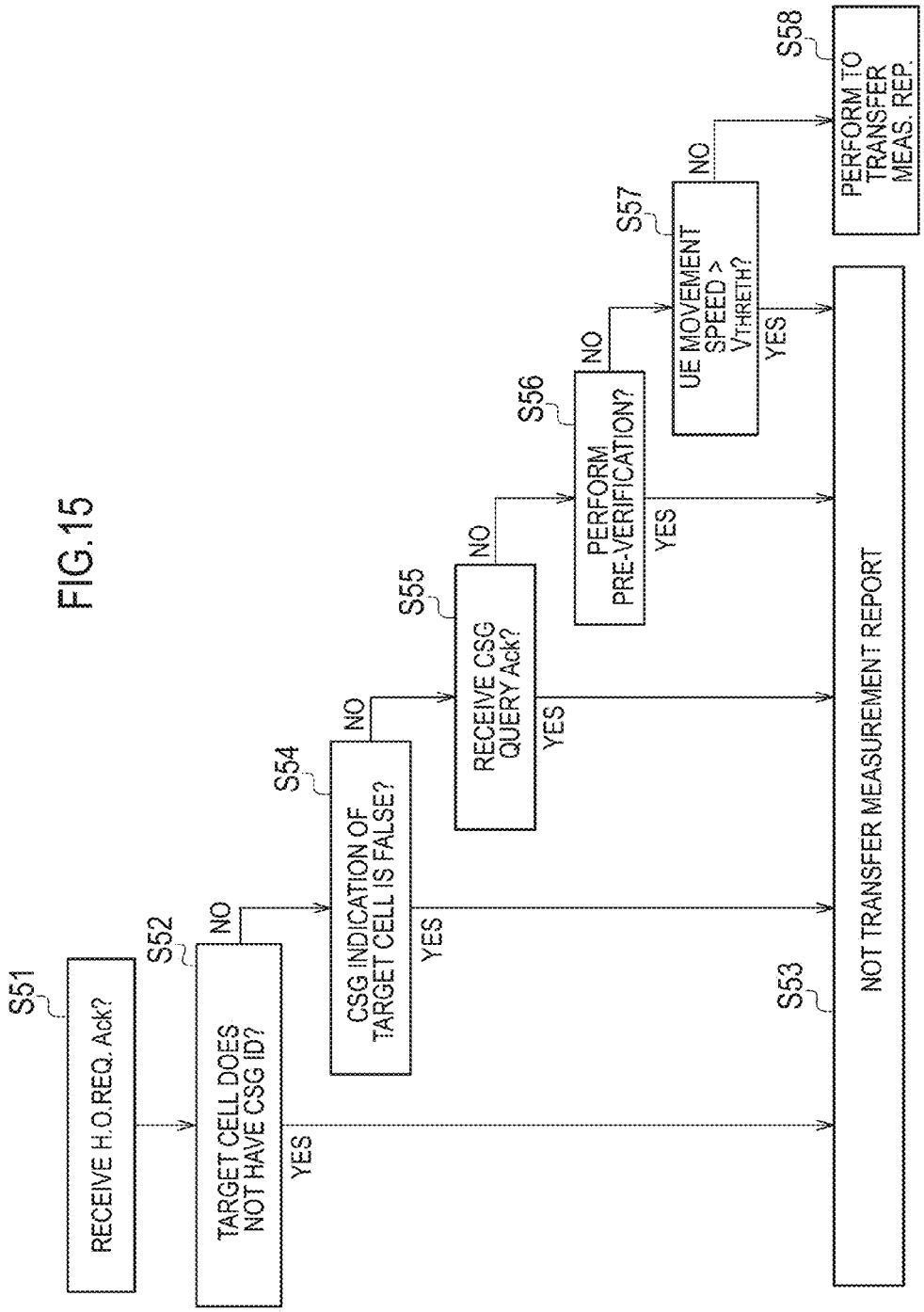

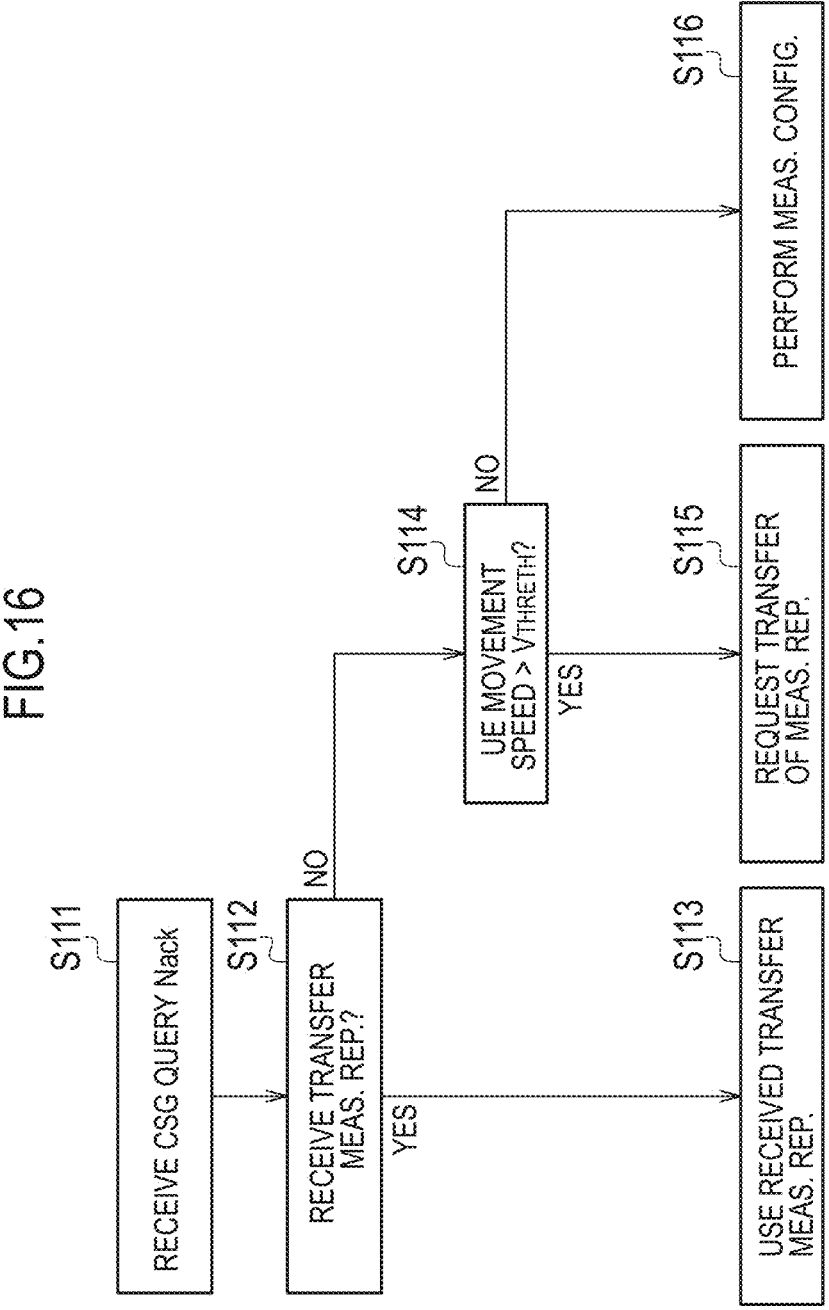

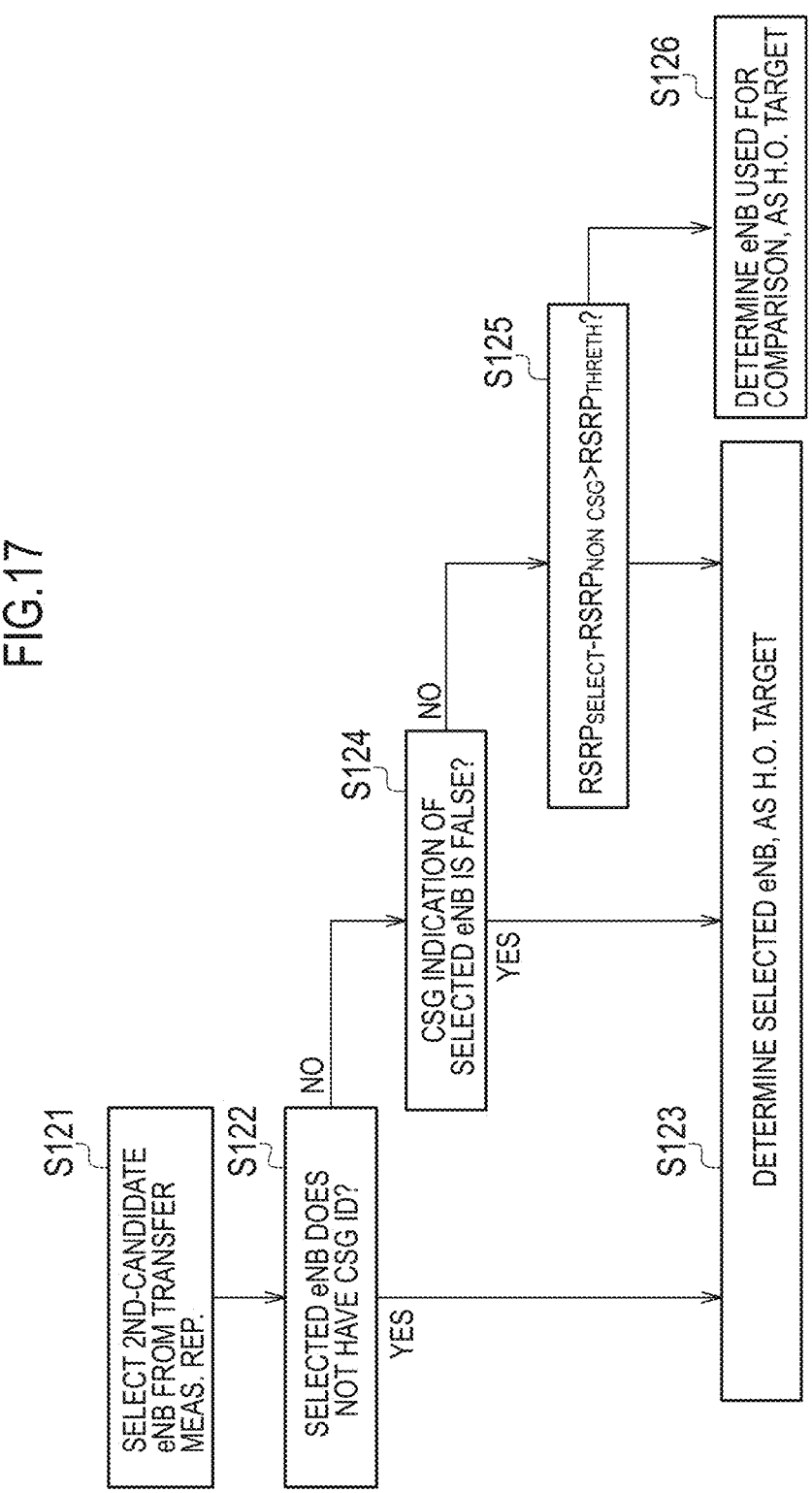

COMMUNICATION CONTROL METHOD, MOBILITY MANAGEMENT DEVICE, HOME BASE STATION, AND BASE STATION

RELATED APPLICATION

The present application is a continuation of U.S. patent application Ser. No. 14/384,794, filed Sep. 12, 2014, which is a National Phase of International Application Number PCT/JP2013/057517 filed on Mar. 15, 2013, and claims priority of U.S. Provisional Application No. 61/612,055 filed Mar. 16, 2012. The entire disclosure of U.S. patent application Ser. No. 14/384,794, filed Sep. 12, 2014, is incorporated by reference herein.

TECHNICAL FIELD

The present disclosure relates to a communication control method, a mobility management device, a home base station, and a base station in a mobile communication system.

BACKGROUND ART

In 3GPP (3rd Generation Partnership Project) which is a project aiming to standardize a mobile communication system, specifications of a home base station, which is a small base station provided in a home or a company, are discussed (see Non Patent Document 1).

A home base station forms a specific cell such as a CSG (Closed Subscriber Group) cell or a hybrid cell. The CSG cell is a cell accessible only by a user terminal (called a "CSG member") having an access permission. The hybrid cell is accessible by other terminals other than the CSG member, but the CSG member is advantageously treated.

In addition, it is noted that a "cell" is used as a term indicating a minimum unit of a radio communication area, and is also used as a term indicating a function of performing radio communication with a user terminal.

In a handover procedure of a user terminal to a specific cell, a mobility management device included in a core network performs verification (access control) of the user terminal for access permission to the specific cell.

PRIOR ART DOCUMENT

Non-Patent Document

Non-Patent Document 1: 3GPP technology specifications "TS 36.300 V11.0.0" December, 2011

SUMMARY OF THE DISCLOSURE

Meanwhile, there is considered a case in which a user terminal is erroneously handed over to a specific cell for which the user terminal has no access permission depending on situations.

However, according to current specifications, there is a problem that such a special case is not considered.

Therefore, an object of the present disclosure is to provide a base station, an apparatus and a communication control method, with which it is possible to appropriately cope with a case in which a user terminal is erroneously handed over to a specific cell for which the user terminal has no access permission.

A base station of the present disclosure is a base station that forms a serving cell of a user terminal in a mobile communication system including a mobility management apparatus, including a receiver configured to receive a measurement report from the user terminal, a controller configured to initiate a cell setting procedure in which a Closed Subscriber Group (CSG) cell formed by a home base station is set as a new serving cell of the user terminal, wherein, in the cell setting procedure, the mobility management apparatus verifies whether the user terminal is a member of the CSG cell on the basis of identification information of the CSG cell, and a transmitter configured to transmit measurement information to the home base station at a time of the cell setting procedure, the measurement information being at least a part of the measurement report from the user terminal, wherein the measurement information includes an identifier of the CSG cell and measurement results associated to the CSG cell, the measurement results including Reference Signal Received Power (RSRP) associated to the CSG cell and/or Reference Signal Received Quality (RSRQ) associated to the CSG cell.

An apparatus of the present disclosure is an apparatus to be provided in a base station that forms a serving cell of a user terminal in a mobile communication system including a mobility management apparatus, including at least one processor and at least one memory, the at least one processor being configured to receive a measurement report from the user terminal, initiate a cell setting procedure in which a Closed Subscriber Group (CSG) cell formed by a home base station is set as a new serving cell of the user terminal, wherein, in the cell setting procedure, the mobility management apparatus verifies whether the user terminal is a member of the CSG cell on the basis of identification information of the CSG cell, and transmit measurement information to the home base station at a time of the cell setting procedure, the measurement information being at least a part of the measurement report from the user terminal, wherein the measurement information includes an identifier of the CSG cell and measurement results associated to the CSG cell, the measurement results including Reference Signal Received Power (RSRP) associated to the CSG cell and/or Reference Signal Received Quality (RSRQ) associated to the CSG cell.

A communication control method of the present disclosure is a communication control method applied to a base station that forms a serving cell of a user terminal in a mobile communication system including a mobility management apparatus, including receiving a measurement report from the user terminal, initiating a cell setting procedure in which a Closed Subscriber Group (CSG) cell formed by a home base station is set as a new serving cell of the user terminal, wherein, in the cell setting procedure, the mobility management apparatus verifies whether the user terminal is a member of the CSG cell on the basis of identification information of the CSG cell, and transmitting, measurement information to the home base station at a time of the cell setting procedure, the measurement information being at least a part of the measurement report from the user terminal, wherein the measurement information includes an identifier of the CSG cell and measurement results associated to the CSG cell, the measurement results including Reference Signal Received Power (RSRP) associated to the CSG cell and/or Reference Signal Received Quality (RSRQ) associated to the CSG cell.

BRIEF DESCRIPTION OF THE DRAWINGS

FIG. 15 is a flowchart of a transfer determination process of a measurement report.

FIG. 16 is a flowchart of an acquisition method determination process of the measurement report.

FIG. 17 is a flowchart of a target cell determination process.

DESCRIPTION OF THE EMBODIMENT

[Overview of Embodiment]

Figure 1:
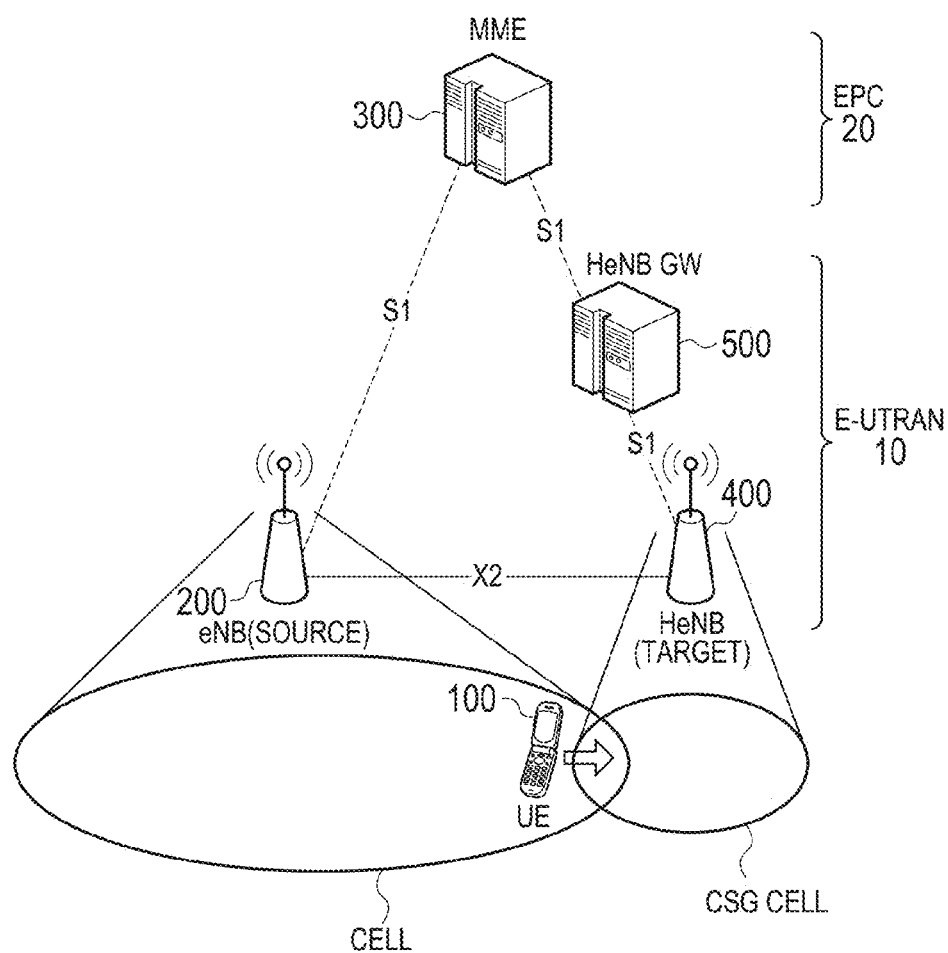
FIG. 1 is a configuration diagram of a mobile communication system.

A communication control method according to an embodiment is applied to a mobile communication system including a home base station configured to forma specific cell and a mobility management device configured to perform verification of a user terminal for access permission to the specific cell in a handover procedure of the user terminal to the specific cell. The communication control method includes a step A of transmitting, by the mobility management device, verification failure information indicating failure of the verification to the home base station when the verification is failed after the user terminal establishes a connection to the specific cell in the handover procedure, and a step B of starting, by the home base station, a re-handover procedure of the user terminal to another cell from the specific cell while maintaining the connection in response to the reception of the verification failure information from the mobility management device.

In this way, even when the user terminal establishes a connection to a specific cell for which the user terminal has no access permission in the handover procedure (that is, when handover is erroneously succeeded), the re-handover procedure of the user terminal to the other cell from the specific cell is started while maintaining the connection, so that it is possible to prevent communication interruption from occurring in the user terminal.

In the present embodiment, the step A may comprise a step A1 of transmitting, by the mobility management device, a negative response for a path switch request to the home base station together with the verification failure information on the basis of the path switch request from the home base station. In the step A, the mobility management device may transmit the verification failure information together with the negative response.

In the present embodiment, the communication control method further may comprises a step C of transferring, by a base station forming a source cell in the handover procedure, measurement information to the home base station, the measurement information being at least a part of a measurement report from the user terminal, and a step D of determining, by the home base station, the other cell on the basis of the measurement information from the base station.

In the present embodiment, in the step C, the base station may transfer the measurement information to the home base station at a time of data forwarding or a handover request in the handover procedure.

In the present embodiment, in the step C, the base station may transfer the measurement information to the home base station when the specific cell is in a closed access mode.

In the present embodiment, in the step C, the base station transfers the measurement information to the home base station when the verification is omitted in the handover procedure.

In the present embodiment, the communication control method may comprises a step E of transmitting, by the home base station, a transfer request of the measurement information to the base station, and in the step C, the base station may transfer the measurement information to the home base station in response to the transfer request.

In the present embodiment, the communication control method further may comprises a step F of transmitting, by the home base station, a transmission request of a measurement report to the user terminal in response to the reception of the verification failure information from the mobility management device, and a step G of determining, by the home base station, the other cell on the basis of the measurement report from the user terminal.

A mobility management device of the present disclosure is a mobility management device performing verification of a user terminal for access permission to a specific cell in a handover procedure of the user terminal to the specific cell in a mobile communication system including a home base station that forms the specific cell. The mobility management device comprises transmission unit that transmits verification failure information indicating failure of the verification to the home base station together with a negative response for a path switch request from the home base station when the verification is failed after the user terminal establishes a connection to the specific cell in the handover procedure, control unit that controls the user terminal to be detached in response to transmission of the negative response, and reception unit that receives a withholding request of detach of the user terminal from the home base station, wherein the control unit withholds the detach of the user terminal in response of reception of the withholding request by the reception unit.

A home base station of the present disclosure is a home base station forming a specific cell in a mobile communication system including a mobility management device that performs verification of a user terminal for access permission to the specific cell in a handover procedure of the user terminal to the specific cell. The home base station comprises reception unit that receives verification failure information indicating failure of the verification from the mobility management device when the verification is failed after the user terminal establishes a connection to the specific cell in the handover procedure, and control unit that controls a re-handover procedure of the user terminal to another cell from the specific cell to be started while maintaining the connection in response to reception of the verification failure information from the mobility management device.

A base station of the present disclosure is abase station forming a source cell in a handover procedure in a mobile communication system including a home base station that forms a specific cell and a mobility management device that performs verification of a user terminal for access permission to the specific cell in the handover procedure of the user terminal to the specific cell. The base station comprises transfer unit that transfers measurement information to the home base station at a time of the handover procedure or at a time of reception of a transfer request from the home base station, the measurement information being at least a part of a measurement report from the user terminal.

[Embodiment]

In the present embodiment, an example of a mobile communication system configured on the basis of 3GPP standards (that is, LTE-Advanced) after release 10 will be described.

Hereinafter, (1) Overview of mobile communication system, (2) Block configuration, (3) Operation, and (4) Conclusion of embodiment will be sequentially described. In all drawings for explaining the following embodiment, the same or similar reference numerals are used to designate the same or similar elements.

(1) Overview of Mobile Communication System

FIG. 1 is a configuration diagram of a mobile communication system according to the present embodiment. As illustrated in FIG. 1, the mobile communication system includes a user terminal (UE: User Equipment) 100, a base station (eNB: evolved Node-B) 200, a mobility management device (MME: Mobility Management Entity) 300, a home base station (HeNB: Home evolved Node-B) 400, and a gateway device (HeNB GW: Home evolved Node-B Gateway) 500.

Each of the eNB 200, the HeNB 400, and the HeNB GW 500 is a network device included in a radio access network (E-UTRAN: Evolved-UMTS Terrestrial Radio Access Network) 10. The MME 300 is a network device included in a core network (EPC: Evolved Packet Core) 20.

The UE 100 is a mobile radio communication device carried by a user. The UE 100 performs radio communication with a cell (called a "serving cell"), with which an RRC connection has been established, in an RRC connected state corresponding to a state during communication.

When the UE 100 moves together with the movement of a user, a change in the serving cell of the UE 100 is necessary. An operation, in which the UE 100 changes the serving cell in an RRC connected state, is called "handover". A series of procedures of the handover are called a "handover procedure". The handover procedure includes a handover preparation stage (H.O. Preparation), a handover execution stage (H.O. Execution), and a handover completion stage (H.O. Completion).

In the present embodiment, the UE 100 employing a cell of the eNB 200 as a serving cell moves toward a cell of the HeNB 400, thereby performing handover from the cell of the eNB 200 to the cell of the HeNB 400. In this case, in the handover procedure, the cell of the eNB 200 is a "source cell" and the cell of the HeNB 400 is a "target cell".

The eNB 200 is a macro base station (MeNB), a pico base station (PeNB), or a home base station (HeNB). In the present embodiment, a description will be provided for an example in which the eNB 200 is considered to be MeNB. The eNB 200 forms one cell or a plurality of cells. The eNB 200 performs radio communication with the UE 100.

The eNB 200 has a determination right of handover for the UE 100 subordinate to the cell of the eNB 200. Specifically, the eNB 200 is able to determine whether to perform handover of the UE 100 to the cell of the HeNB 400 on the basis of a measurement report (Measurement Report) from the UE 100.

The eNB 200 communicates with the EPC 20 through an S1 interface that is a logical communication path between the eNB 200 and the EPC 20. Specifically, the eNB 200 communicates with the MME 300 through an S1-MME interface which is a kind of the S1 interface. Moreover, the eNB 200 is able to perform inter-base station communication with an adjacent HeNB 400 through an X2 interface that is a logical communication path between the adjacent HeNB 400 and the eNB 200.

The MME 300 is provided corresponding to a control plane dealing with control information, and performs various types of mobility management or verification processes for the UE 100. The MME 300 performs the verification (hereinafter, "CSG verification") of the UE 100 for access permission to the CSG cell.

A general handover procedure to the CSG cell uses the S1 interface. Specifically, the MME 300 performs the CSG verification of the UE 100, specifically, confirms whether the UE 100 is a member of the CSG cell. When it is confirmed that the UE 100 is the member of the CSG cell (that is, in the case of CSG verification success), the handover of the UE 100 to the CSG cell is possible. On the other hand, when it is not confirmed that the UE 100 is the member of the CSG cell (that is, in the case of CSG verification failure), the handover of the UE 100 to the CSG cell is rejected.

The HeNB 400 is a small stationary radio communication device installable within the house. The eNB 200 forms a specific cell having a coverage narrower than that of a cell. The specific cell is called a "CSG cell (a closed mode)", a "hybrid cell (a hybrid mode)", or an "open cell (an open mode)" according to a set access mode.

The CSG cell is a cell accessible only by a UE 100 (called a "member") having an access permission, and broadcasts CSG ID. The UE 100 holds a list (called a "white list") of CSG ID for which the UE 100 has an access permission, and determines the presence or absence of access permission, on the basis of the white list, and the CSG ID broadcasted by the CSG cell.

The hybrid cell is a cell in which the member is more advantageously treated as compared with a non-member, and broadcasts information (CSG Indication), which indicates that the hybrid cell is a cell released to the non-member, in addition to the CSG ID. The UE 100 determines the presence or absence of access permission on the basis of the white list, and the CSG ID broadcasted by the hybrid cell.

As described above, the UE 100 confirms the presence or absence of access permission on the basis of the white list, but the white list managed by the UE 100 and CSG subscriber information (CSG Subscription Data) managed by the MME 300 are not always synchronized with each other. Therefore, basically, in a handover procedure of the UE 100 to the CSG cell or the hybrid cell, the CSG verification of the UE 100 by the MME 300 is necessary.

The open cell is a cell in which the UE 100 is equivalently treated regardless of whether the UE 100 is a member, and does not broadcast the CSG ID. In view of the UE 100, the open cell is equal to a normal cell.

Hereinafter, a description will be provided for the case in which a cell (a specific cell) of the HeNB 400 is considered to be the CSG cell.

The HeNB 400 communicates with the MME 300 via the HeNB GW 500 through the S1 interface (the S1-MME interface). However, when the S1 interface not via the HeNB GW 500 is established between the HeNB 400 and the MME 300, the HeNB 400 is able to directly communicate with the MME 300, without undergoing the HeNB GW 500. The HeNB 400 is connected (an X2 connection) to the eNB 200 through the X2 interface.

The HeNB GW 500 manages a set of a plurality of HeNBs 400 between the EPC 20 (the MME 300) and the plurality of HeNBs 400. In view of the MME 300, the HeNB GW 500 is equal to the HeNB 400. On the other hand, in view of the HeNB 400, the HeNB GW 500 is equal to the MME 300. The HeNB GW 500 communicates with the MME 300 as a representative of the plurality of HeNBs 400, thereby reducing traffic to be transmitted to/received from the MME 300. Furthermore, the HeNB GW 500 is able to relay data from one HeNB 400 managed by the HeNB GW 500 to another HeNB 400.

Figure 2:
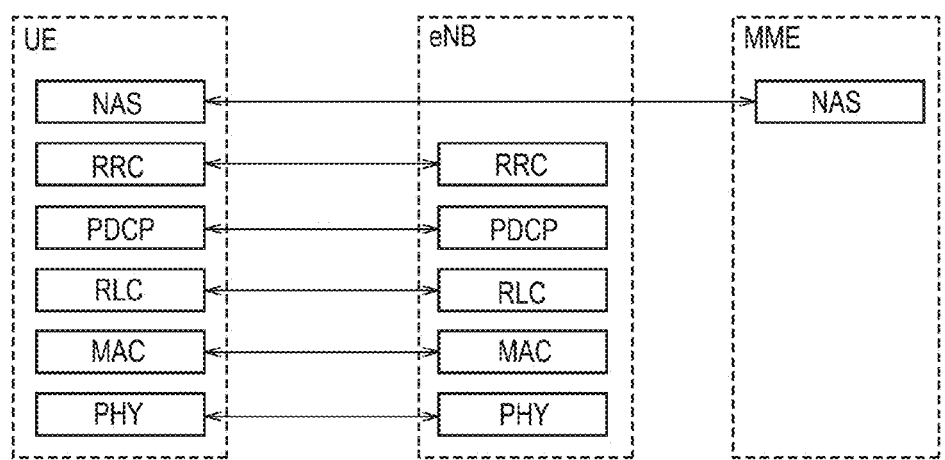
FIG. 2 is a protocol stack diagram of a radio interface.

FIG. 2 illustrates a protocol stack of a radio interface of the mobile communication system (an LTE system) according to the present embodiment.

As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs data coding/decoding, modulation/demodulation, antenna mapping/demapping, and resource mapping/demapping. The PHY layer provides a transmission service to an upper layer using a physical channel. Between a PHY layer of the UE 100 and a PHY layer of eNB (the eNB 200 or the HeNB 400), data is transmitted through the physical channel. The PHY layer is connected to the MAC layer through a transport channel.

The MAC layer performs preferential control of data, and a retransmission process and the like by hybrid ARQ (HARQ). Between a MAC layer of the UE 100 and a MAC layer of the eNB (the eNB 200 or the HeNB 400), data is transmitted through the transport channel. The MAC layer of the eNB (the eNB 200 or the HeNB 400) includes MAC scheduler for determining a transport format and a resource block of an uplink and a downlink. The transport format includes a transport block size, a modulation/coding scheme (MCS), and antenna mapping.

The RLC layer transmits data to an RLC layer of a reception side using the functions of the MAC layer and the PHY layer. Between an RLC layer of the UE 100 and an RLC layer of the eNB (the eNB 200 or the HeNB 400), data is transmitted through a logical channel.

The PDCP layer performs header compression/extension and encryption/decryption.

The RRC layer is defined only in a control plane. Between the RRC layer of the UE 100 and the RRC layer of the eNB (the eNB 200 or the HeNB 400), data is transmitted through a radio bearer. The RRC layer controls the logical channel, the transport channel, and the physical channel in response to establishment, re-establishment, and release of the radio bearer. When there is an RRC connection between RRC of the UE 100 and RRC of the eNB (the eNB 200 or the HeNB 400), the UE 100 is in an "RRC connected state". Otherwise, the UE 100 is in an "RRC idle state".

A NAS (Non-Access Stratum) layer positioned above the RRC layer is provided in the UE 100 and the MME 300 to perform session management or mobility management.

Figure 3:
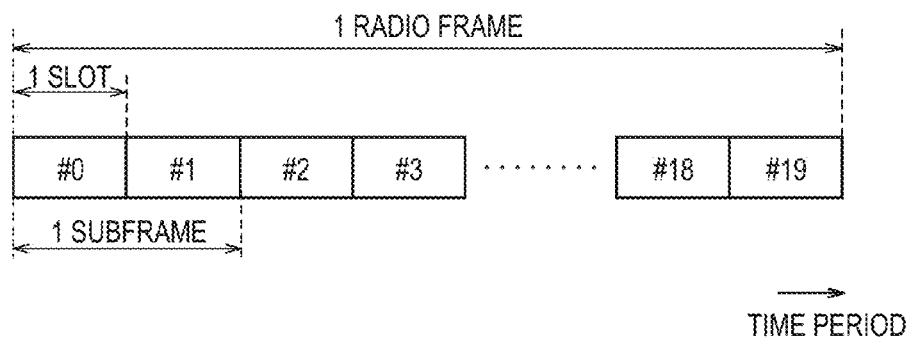
FIG. 3 is a configuration diagram of a radio frame.

FIG. 3 is a configuration diagram of a radio frame used in the mobile communication system (an LTE system) according to the present embodiment. The LTE system employs OFDMA (Orthogonal Frequency Division Multiple Access) in a downlink and SC-FDMA (Single Carrier Frequency Division Multiple Access) in an uplink.

As illustrated in FIG. 3, the radio frame includes 10 subframes arranged in a time-period direction, wherein each subframe includes two slots arranged in the time-period direction. Each subframe has a length of 1 ms and each slot has a length of 0.5 ms. Each subframe includes a plurality of resource blocks (RBs) in a frequency direction, and a plurality of symbols in the time-period direction. Each symbol is provided at a head thereof with a guard interval called a cyclic prefix (CP).

In the downlink, an interval of several symbols at the head of each subframe is a control region mainly used as a physical downlink control channel (PDCCH). Furthermore, the other interval of each subframe is a data region mainly used as a physical downlink shared channel (PDSCH). In the downlink, reference signals (RS) different from each other in each cell are transmitted.

In the uplink, both end portions in the frequency direction of each subframe are control regions mainly used as a physical uplink control channel (PUCCH). Furthermore, the center portion in the frequency direction of each subframe is a data region mainly used as a physical uplink shared channel (PUSCH).

(2) Block Configuration

Hereinafter, the block configurations of the UE 100, the eNB 200, the MME 300, the HeNB 400, and the HeNB GW 500 will be described.

(2.1) UE

Figure 4:
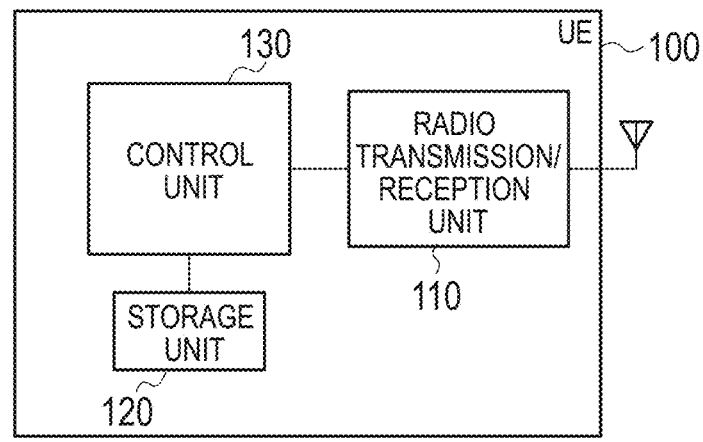
FIG. 4 is a block diagram of UE.

FIG. 4 is a block diagram of the UE 100. As illustrated in FIG. 4, the UE 100 includes a radio transmission/reception unit 110, a storage unit 120, and a control unit 130.

The radio transmission/reception unit 110 transmits/receives a radio signal.

The storage unit 120 stores various types of information that is used for the control by the control unit 130. The control unit 130 controls various functions of the UE 100. In an RRC connected state, the control unit 130 controls the radio transmission/reception unit 110 to perform radio communication with a serving cell.

The storage unit 120 stores a white list. The white list is updated by the control unit 130. In the RRC connected state, the control unit 130 updates the white list in response to a white list update message from the MME 300. Alternatively, in an idle state, the control unit 130 may update the white list in response to information which is manually input.

Furthermore, the storage unit 120 stores location information (fingerprint information) on the location of a CSG cell for which the UE 100 has an access permission.

When the UE 100 is in the RRC connected state in the cell of the eNB 200, if it is detected that the UE 100 entered the vicinity of the CSG cell, for which the UE 100 has an access permission, on the basis of the location information (the fingerprint information) on the location of the CSG cell for which the UE 100 has an access permission, then the control unit 130 controls the radio transmission/reception unit 110 to transmit proximity notification (Proximity Indication) to the eNB 200.

When the radio transmission/reception unit 110 receives measurement control information (Measurement configuration) on the CSG cell from the eNB 200 in response to the proximity notification, the control unit 130 controls the radio transmission/reception unit 110 to transmit a measurement report including a physical identifier (PCI: Physical Cell Identifier) of the CSG cell to the eNB 200.

When the radio transmission/reception unit 110 receives request information (SI request) requesting the acquisition of broadcast information (SI: System Information) from the eNB 200 in response to the measurement report, the control unit 130 acquires broadcast information of the CSG cell and controls the radio transmission/reception unit 110 to transmit a measurement report based on the broadcast information to the eNB 200. The measurement report includes an identifier (CGI: Cell Global Identifier) of the CSG cell, a tracking area identifier (TAI), CSG ID, and status information (Membership status) indicating whether the UE 100 is a CSG member.

In addition, the radio transmission/reception unit 110 receives reference signals (RS) for each of a plurality of cells (serving cells and adjacent cells). The control unit 130 measures reference signal received power (RSRP) and/or reference signal received quality (RSRQ) for each of the plurality of cells. The measurement report includes the measurement information (RSRP/RSRQ) measured by the control unit 130 for each of the plurality of cells. Specifically, the measurement information is obtained by associating an identifier of a cell with RSRP/RSRQ measured for the cell.

When the radio transmission/reception unit 110 receives a handover command (H.O. Command) to the CSG cell from the eNB 200, the control unit 130 disconnects the RRC connection to the cell (a source cell) of the eNB 200, and starts a process of establishing an RRC connection to the CSG cell of the HeNB 400.

(2.2) eNB

Figure 5:
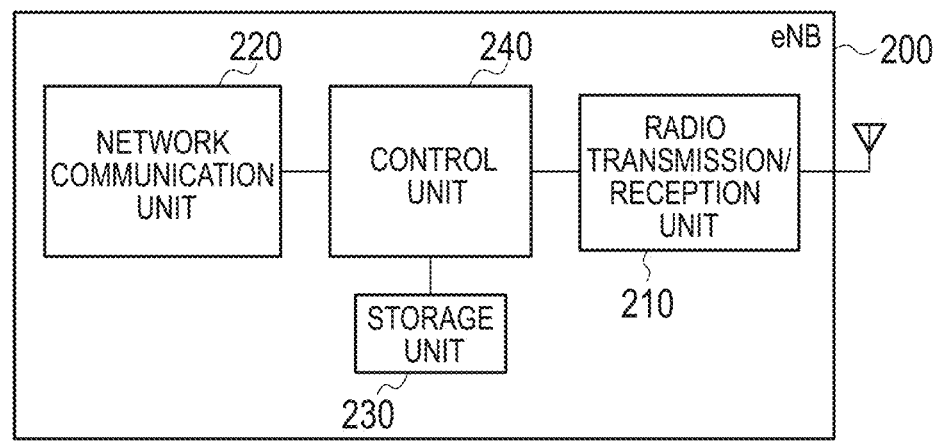
FIG. 5 is a block diagram of eNB.

FIG. 5 is a block diagram of the eNB 200. As illustrated in FIG. 5, the eNB 200 includes a radio transmission/reception unit 210, a network communication unit 220, a storage unit 230, and a control unit 240.

The radio transmission/reception unit 210 transmits/receives a radio signal. Furthermore, the radio transmission/reception unit 210 forms one cell or a plurality of cells.

The network communication unit 220 communicates with the MME 300 through the S1 interface. The network communication unit 220 performs inter-base station communication with the HeNB 400 through the X2 interface.

The storage unit 230 stores various types of information that is used for the control by the control unit 240.

The control unit 240 controls various functions of the eNB 200.

When the radio transmission/reception unit 210 receives the proximity notification (Proximity Indication) from the UE 100 subordinate to the eNB 200, the control unit 240 controls the radio transmission/reception unit 210 to transmit measurement control information (Measurement Configuration) for instructing measurement for the CSG cell to the UE 100.

When the radio transmission/reception unit 210 receives the measurement report including the physical identifier (PCI: Physical Cell Identifier) of the CSG cell from the UE 100 in response to the measurement control information (Measurement Configuration), the control unit 240 controls the radio transmission/reception unit 210 to transmit the request information (SI request) requesting the acquisition of broadcast information (SI: System Information) of the CSG cell to the UE 100.

When the radio transmission/reception unit 210 receives the measurement report based on the broadcast information of the CSG cell from the UE 100 in response to the request information, the control unit 240 determines whether to perform handover of the UE 100 to the CSG cell on the basis of the measurement report.

When it is determined to perform the handover of the UE 100 to the CSG cell, the control unit 240 controls the network communication unit 220 to transmit a handover request (H.O. Request) to the HeNB 400 through the X2 interface.

Then, when a positive response (H.O. Request Ack) for the handover request is obtained from the HeNB 400, the control unit 240 controls the radio transmission/reception unit 210 to transmit a command of the handover (H.O. Command) to the CSG cell to the UE 100.

After the command of the handover to the CSG cell is transmitted, the control unit 240 controls the network communication unit 220 to transfer (data forwarding) non-transmitted data to the UE 100, which remains in a buffer area of the storage unit 230, to the HeNB 400 through the X2 interface.

At the time of the data forwarding, the control unit 240 may transfer the measurement report from the UE 100 to the HeNB 400. At this time, the control unit 240 extracts and transfers partial measurement information included in the measurement report from the UE 100, thereby reducing a data transfer amount.

Hereinafter, the measurement report (the measurement information) transferred from the eNB 200 to the HeNB 400 will be referred to as a "transfer measurement report". The transfer measurement report is used when performing a re-handover procedure from the CSG cell in the HeNB 400 to another cell. The control unit 240 determines whether to transmit the transfer measurement report to the HeNB 400 depending on situations. Details of the determination will be described later.

The control unit 240 extracts the partial measurement information included in the measurement report from the UE 100, for example, using the following method.

The control unit 240 extracts the measurement information including communication quality (RSRP/RSRQ) having a value higher than a threshold value. When a large number of the measurement information is included in the measurement report, the control unit 240 may extract n (for example, three) pieces of measurement information in a descending order of the communication quality (RSRP/RSRQ). Furthermore, in order to increase a handover success rate to a target cell in the re-handover procedure, it is preferable that the control unit 240 more preferentially extracts measurement information including an identifier of a macro cell than measurement information including an identifier of the CSG cell.

Moreover, the control unit 240 may allow additional information, other than the measurement information, to be included in the transfer measurement report. The additional information is information indicating a reception time of the measurement report from the UE 100. The information indicating the reception time of the measurement report is included in the transfer measurement report, so that the HeNB 400 is able to determine newness (that is, reliability) of the transfer measurement report. Alternatively, the additional information is information indicating a movement speed of the UE 100. In addition, the movement speed of the UE 100 is acquirable from the UE 100 or the EPC 20.

(2.3) MME

Figure 6:
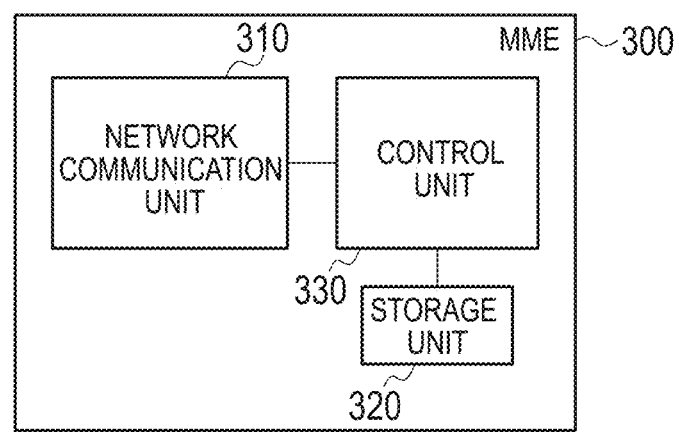
FIG. 6 is a block diagram of MME.

FIG. 6 is a block diagram of the MME 300. As illustrated in FIG. 6, the MME 300 includes a network communication unit 310, a storage unit 320, and a control unit 330.

The network communication unit 310 communicates with the eNB 200 and the HeNB GW 500 through the S1 interface.

The storage unit 320 stores various types of information that is used for the control by the control unit 330. The storage unit 320 stores CSG subscriber information (CSG Subscription Data) regarding the access permission of the UE 100. The CSG subscriber information (CSG Subscription Data) is obtained by associating the identifier of the UE 100 with CSG ID of each CSG cell for which the UE 100 has an access permission.

The control unit 330 controls various functions of the MME 300.

When updating the CSG subscriber information, the control unit 330 may control the network communication unit 310 to transmit, to the UE 100, a white list update message for updating the white list of the UE 100.

In the handover procedure from the cell of the eNB 200 to the CSG cell of the HeNB 400, when the network communication unit 310 receives a path switch request from the HeNB 400, the control unit 330 performs the CSG verification of the UE 100 on the basis of CSG ID, a cell access mode, and the identifier of the UE 100, which are included in the path switch request, and the CSG subscriber information stored in the storage unit 320.

In addition, the path switch request indicates a message for requesting a communication path between the MME 300 and the EPC 20 to be switched from the eNB 200 to the HeNB 400.

When the CSG ID and the identifier of the UE 100, which are included in a CSG verification request, are associated with the CSG subscriber information, the control unit 330 determines CSG verification success and controls the network communication unit 310 to transmit a positive response (Path Switch Request Ack) for the path switch request to the HeNB 400 through the S1 interface.

Meanwhile, when the CSG ID and the identifier of the UE 100, which are included in the CSG verification request, are not associated with the CSG subscriber information, the control unit 330 determines CSG verification failure and controls the network communication unit 310 to transmit a negative response (Path Switch Request Failure) for the path switch request to the HeNB 400 through the S1 interface. In this case, the control unit 330 allows CSG verification failure information (CSG Query Nack) indicating failure of the CSG verification to be included in the negative response.

In addition, current specifications define that the MME 300 transmits the Path Switch Request Failure and then detaches the UE 100. However, after transmitting the Path Switch Request Failure, the control unit 330 withholds the detach of the UE 100, in response to the network communication unit 310 receiving a withholding request of the detach of the UE 100 from the HeNB 400.

(2.4) HeNB

Figure 7:
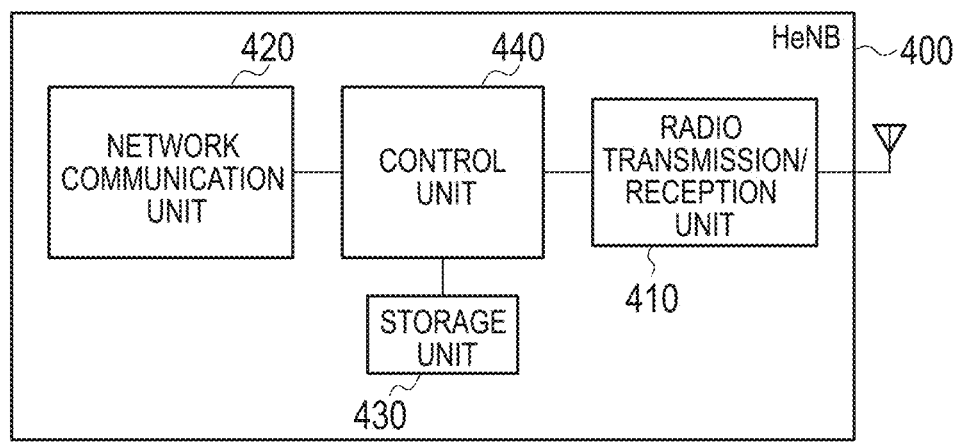
FIG. 7 is a block diagram of HeNB.

FIG. 7 is a block diagram of the HeNB 400. As illustrated in FIG. 7, the HeNB 400 includes a radio transmission/reception unit 410, a network communication unit 420, a storage unit 430, and a control unit 440.

The radio transmission/reception unit 410 transmits/receives a radio signal. In the present embodiment, the radio transmission/reception unit 410 forms the CSG cell. The CSG cell (the radio transmission/reception unit 410) transmits broadcast information through BCCH (Broadcast Control Channel). The broadcast information includes CGI, TAI, and CSG ID.

The network communication unit 420 communicates with the MME 300 via the HeNB GW 500 through the S1 interface. The network communication unit 420 performs inter-base station communication with the eNB 200 through the X2 interface.

The storage unit 430 stores various types of information that is used for the control by the control unit 440.

The control unit 440 controls various functions of the HeNB 400.

When the network communication unit 420 receives the handover request (H.O. Request) from the eNB 200, the control unit 440 determines whether to permit the handover request. When determining to permit the handover request, the control unit 440 controls the network communication unit 420 to transmit a positive response (H.O. Request Ack) for the handover request to the eNB 200 through the X2 interface. On the other hand, when determining to reject the handover request, the control unit 440 controls the network communication unit 420 to transmit a negative response (H.O. Request Nack) for the handover request to the eNB 200 through the X2 interface.

After the positive response (H.O. Request Ack) is transmitted, when the network communication unit 420 receives data transferred (forwarded) from the eNB 200 through the X2 interface, the control unit 440 controls the data to be stored in the storage unit 430. When the data includes the transfer measurement report, the control unit 440 acquires the transfer measurement report, and controls the acquired transfer measurement report to be stored in the storage unit 430.

Furthermore, after the positive response (H.O. Request Ack) is transmitted, when access from the UE 100 is detected, the control unit 440 controls the radio transmission/reception unit 410 to establish an RRC connection to the UE 100.

After the RRC connection to the UE 100 is established, the control unit 440 controls the network communication unit 420 to transmit a path switch request to the MME 300 through the S1 interface.

When the network communication unit 420 receives a positive response (Path Switch Request Ack) for the path switch request from the MME 300, the control unit 440 transmits forwarding data stored in the storage unit 430 to the UE 100, and then controls the radio transmission/reception unit 410 and the network communication unit 420 to transfer user data which is transmitted/received between the EPC 20 and the UE 100.

On the other hand, when the network communication unit 420 receives a negative response (Path Switch Request Failure) for the path switch request from the MME 300, the control unit 440 confirms whether CSG verification failure information (CSG Query Nack) is included in the negative response. When the CSG verification failure information (CSG Query Nack) is included in the negative response, the control unit 440 starts the re-handover procedure of the UE 100 to another cell from the CSG cell.

Until a handover command to another cell (a target cell) in the re-handover procedure is transmitted to the UE 100 after the CSG verification failure information (CSG Query Nack) is received, the control unit 440 controls the radio transmission/reception unit 410 to maintain the RRC connection to the UE 100.

In addition, since the current specifications define that the MME 300 transmits the Path Switch Request Failure and then detaches the UE 100, it is necessary to withhold the MME 300 from performing the detach of the UE 100. Therefore, when the network communication unit 420 receives the Path Switch Request Failure including the CSG Query Nack, the control unit 440 controls the network communication unit 420 to transmit a withholding request of the detach of the UE 100 to the MME 300 through the S1 interface.

In the re-handover procedure, in order to determine the other cell (the target cell), a measurement report (measurement information) obtained by measurement in the UE 100 is necessary. A method for acquiring the measurement report includes the following three patterns.

In an operation pattern 1, the control unit 440 determines the target cell on the basis of the transfer measurement report (that is, the forwarded transfer measurement report) stored in the storage unit 430.

In an operation pattern 2, the control unit 440 controls the network communication unit 420 to request the eNB 200 to transmit the transfer measurement report, thereby acquiring the transfer measurement report from the eNB 200.

In an operation pattern 3, the control unit 440 controls the radio transmission/reception unit 410 to request the UE 100 to transmit the measurement report, thereby acquiring the measurement report from the UE 100.

The control unit 440 determines one of the operation patterns 1 to 3, which is to be applied depending on situations. Details of the determination will be described later.

When determining the other cell (the target cell), the control unit 440 controls the network communication unit 420 to transmit a handover request to eNB forming the other cell. When a positive response (H.O. Request Ack) is received from the eNB, the control unit 440 controls the radio transmission/reception unit 410 to transmit, to the UE 100, a handover command to the other cell.

(2.5) HeNB GW

Figure 8:
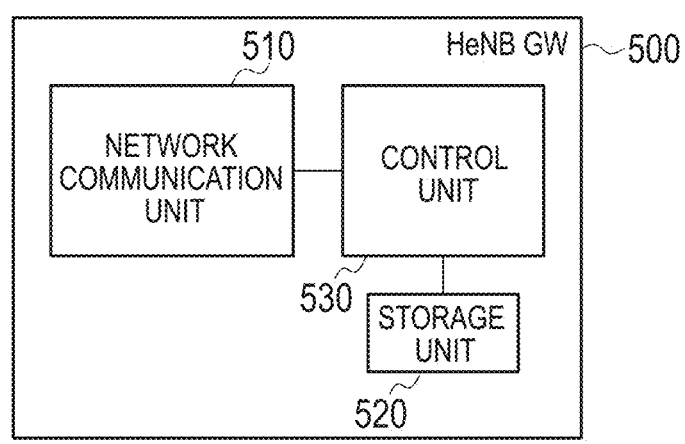
FIG. 8 is a block diagram of HeNB GW.

FIG. 8 is a block diagram of the HeNB GW 500. As illustrated in FIG. 8, the HeNB GW 500 includes a network communication unit 510, a storage unit 520, and a control unit 530.

The network communication unit 510 communicates with the MME 300 and the HeNB 400 through the S1 interface.

The storage unit 520 stores various types of information that is used for the control by the control unit 530. In the storage unit 520, the HeNB 400 managed by the HeNB GW 500 has been registered.

The control unit 530 controls various functions of the HeNB GW 500. The control unit 530 manages a set of a plurality of HeNBs 400. The control unit 530 controls the network communication unit 510 to communicate with the MME 300 as a representative of the plurality of HeNBs 400.

(3) Operation

Hereinafter, the operation of the mobile communication system will be described.

(3.1) Case in which Handover to CSG Cell is Erroneously Succeeded

Before describing the operation patterns 1 to 3 according to the present embodiment, a description will be provided for cases 1 to 3 in which handover to a CSG cell is erroneously succeeded, as comparison examples.

(3.1.1) Case 1

Figure 9:
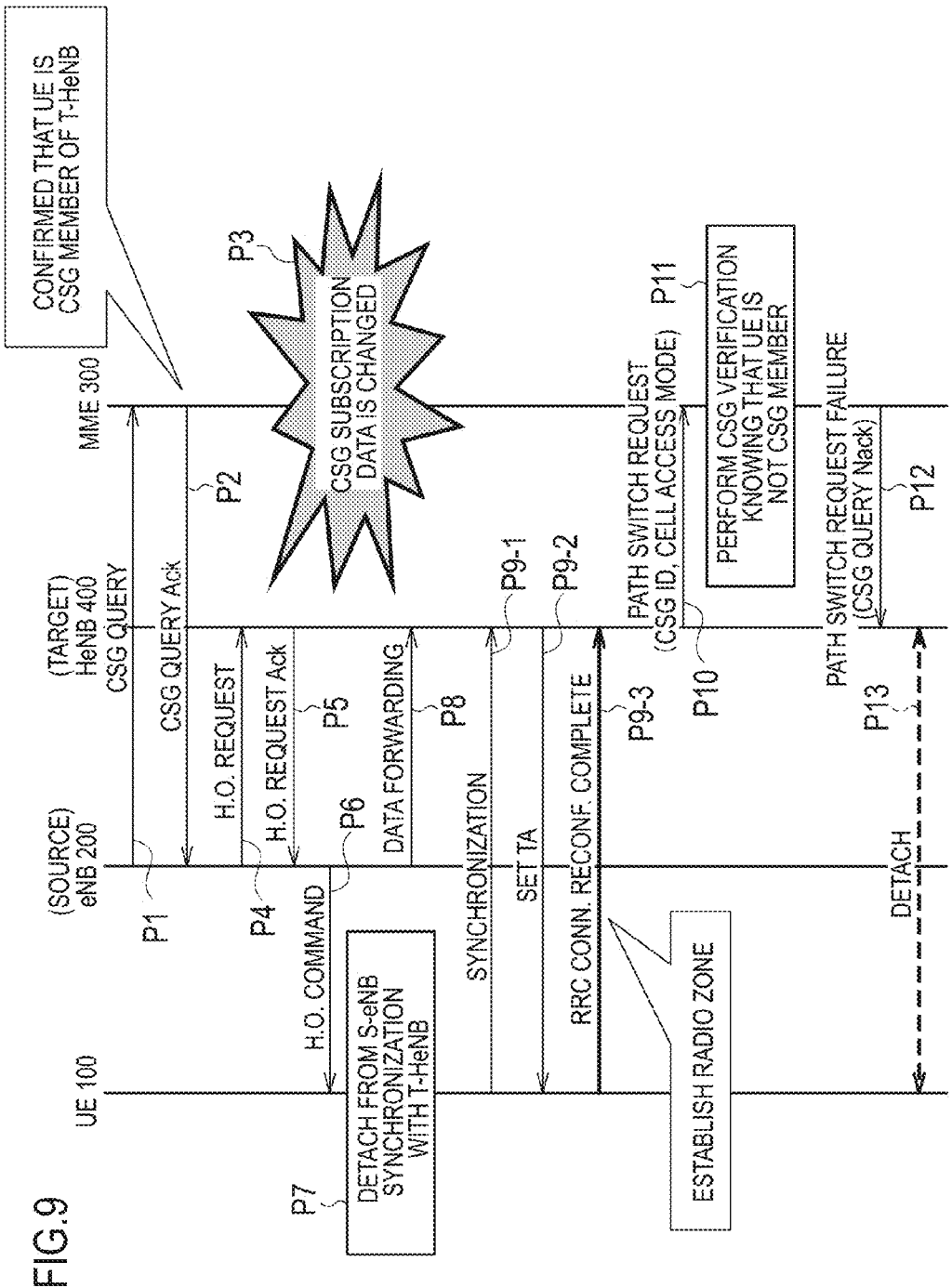
FIG. 9 is a sequence diagram of a case 1 in which handover to a CSG cell is erroneously succeeded.

FIG. 9 is a sequence diagram of a case 1 in which handover to a CSG cell is erroneously succeeded. The present sequence shows an operation after the eNB 200 determines the handover of the UE 100 to the CSG cell of the HeNB 400.

As illustrated in FIG. 9, in step P1, the eNB 200 transmits a query (CSG Query) regarding whether the UE 100 is a member of the CSG cell of the HeNB 400 to the MME 300 through the S1 interface.

In step P2, the MME 300 confirms that the UE 100 is the member of the CSG cell of the HeNB 400, and transmits the confirmed fact (CSG Query Ack) to the eNB 200 through the S1 interface.

Then, in step P3, the MME 300 updates CSG subscriber information (CSG Subscription Data). A description will be given on the assumption that the UE 100 has not been the member of the CSG cell of the HeNB 400 through the update.

In step P4, in response to the reception of the fact (CSG Query Ack) that the UE 100 is the member of the CSG cell of the HeNB 400, the eNB 200 transmits a handover request (H.O. Request) for requesting handover of the UE 100 to the CSG cell of the HeNB 400 to the HeNB 400 through the X2 interface. The HeNB 400 determines whether to permit acceptance of the UE 100 in response to the handover request from the eNB 200. Hereinafter, a description will be given on the assumption that the acceptance of the UE 100 is permitted.

In step P5, the HeNB 400 transmits a positive response (H.O. Request Ack) for the handover request from the eNB 200 to the eNB 200 through the X2 interface.

In step P6, the eNB 200 transmits a handover command (H.O. Command) to the CSG cell of the HeNB 400 to the UE 100 in response to the positive response (H.O. Request Ack) from the HeNB 400.

In step P7, the UE 100 disconnects an RRC connection to the eNB 200 in response to the handover command from the eNB 200, and starts a process for establishing an RRC connection to the CSG cell of the HeNB 400.

In step P8, the eNB 200 transfers (forwards) non-transmitted data, which is directed to the UE 100, to the HeNB 400 through the X2 interface.

In step P9, the UE 100 establishes the RRC connection to the CSG cell of the HeNB 400. Specifically, in step P9-1, the UE 100 establishes synchronization with the CSG cell of the HeNB 400 with a random access procedure. In step P9-2, the HeNB 400 notifies the UE 100 of a timing advance (TA) for adjusting a transmission timing of the UE 100. In step P9-3, the UE 100 notifies the HeNB 400 of the fact that the RRC connection to the CSG cell of the HeNB 400 is completely established.

In step P10, the HeNB 400 transmits a path switch request to the MME 300 through the S1 interface. The path switch request includes CSG ID and a cell access mode.

In step P11, the MME 300 performs CSG verification of the UE 100 on the basis of the path switch request from the HeNB 400. As described above, since the UE 100 has not been the member of the CSG cell of the HeNB 400 in the step P3, the CSG verification is failed.

In step P12, the MME 300 transmits a negative response (Path Switch Request Failure) for the path switch request from the HeNB 400 to the HeNB 400 through the S1 interface. The negative response includes CSG verification failure information (CSG Query Nack).

In step P13, the HeNB 400 disconnects the RRC connection to the UE 100 in response to the negative response (Path Switch Request Failure) from the MME 300. As a consequence, the UE 100 is transitioned to an idle state and communication is stopped.

(3.1.2) Case 2

Figure 10:
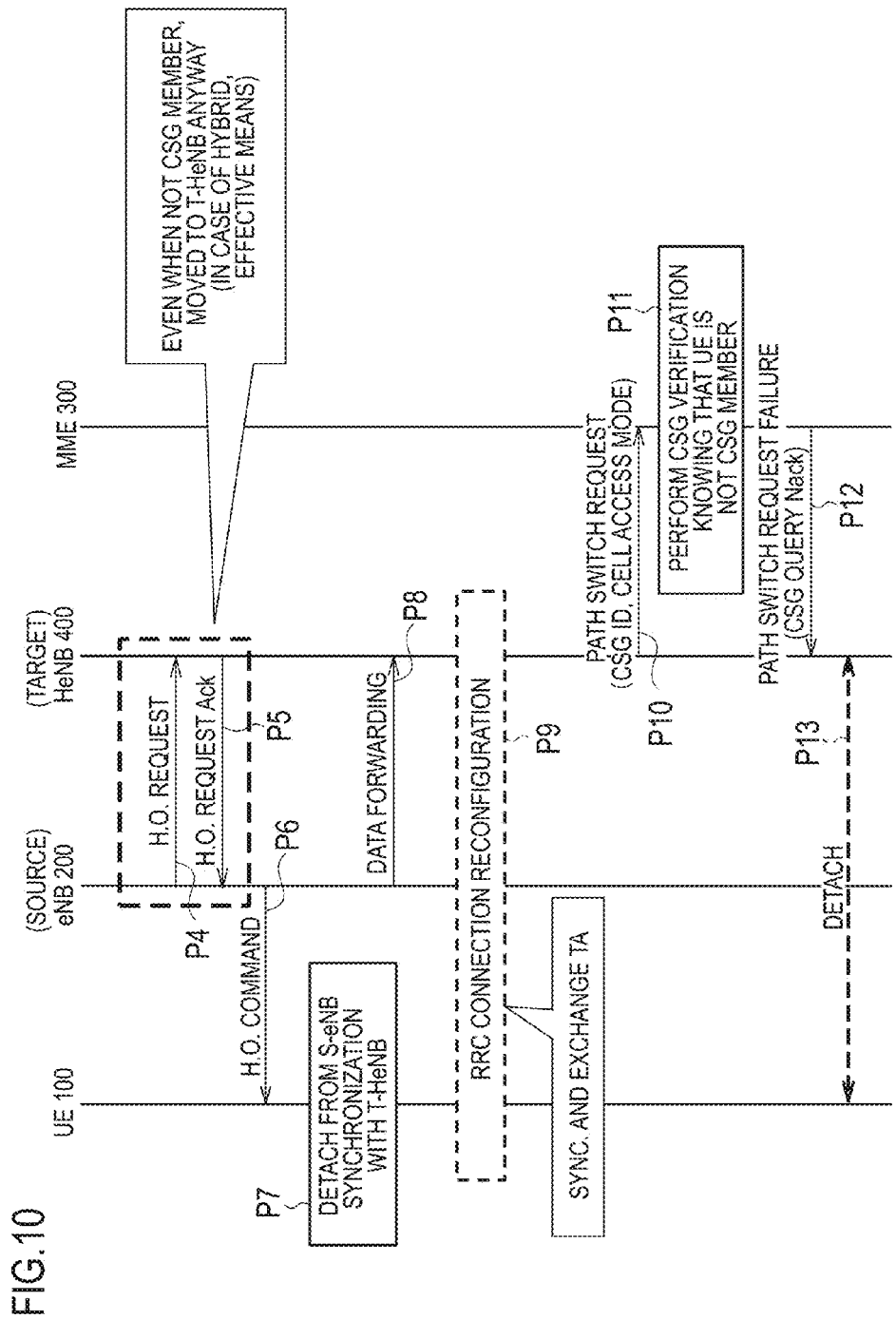
FIG. 10 is a sequence diagram of a case 2 in which handover to a CSG cell is erroneously succeeded.

FIG. 10 is a sequence diagram of a case 2 in which handover to a CSG cell is erroneously succeeded.

As illustrated in FIG. 10, the case 2 is different from the case 1 in that no query (CSG Query) is transmitted to the MME 30 before the handover request. When the cell of the HeNB 400 is a hybrid cell (is in a hybrid mode), even though the handover of the UE 100 to the cell is performed, communication can be continued. Therefore, in the case 2, first of all, handover is performed, and the CSG verification is performed using the path switch request.

However, when the cell of the HeNB 400 is a CSG cell (is in a closed mode), if the CSG verification is failed, the RRC connection between the UE 100 and the HeNB 400 is disconnected and communication is stopped similarly to the case 1.

(3.1.3) Case 3

Figure 11:
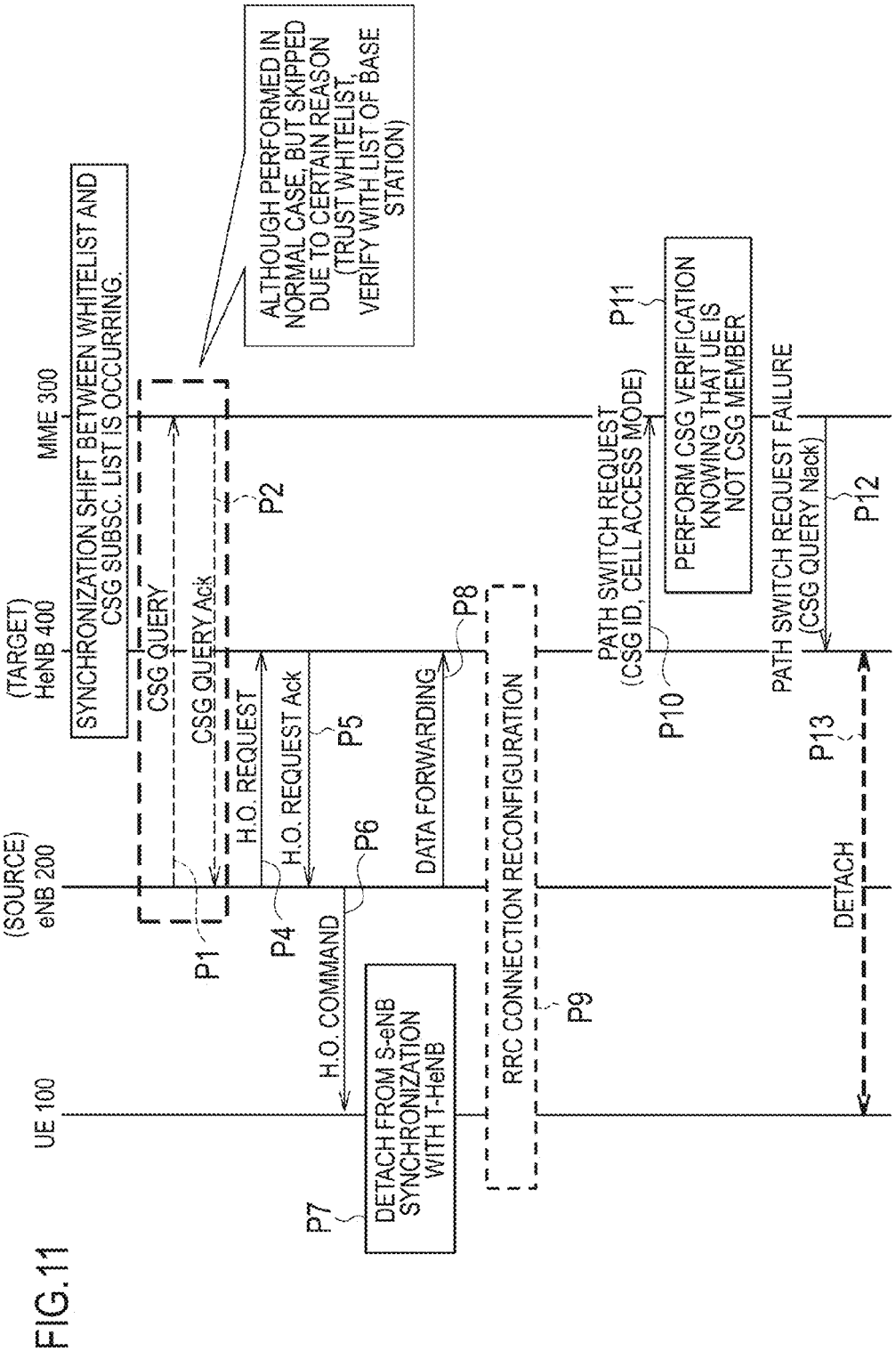
FIG. 11 is a sequence diagram of a case 3 in which handover to a CSG cell is erroneously succeeded.

FIG. 11 is a sequence diagram of a case 3 in which handover to a CSG cell is erroneously succeeded.

As illustrated in FIG. 11, the case 3 is different from the case 1 in that the query (CSG Query) is basically transmitted to the MME 30 before the handover request, and the query (CSG Query) to the MME 300 is exceptionally omitted. For example, there is considered an operation in which the handover request is made without the CSG verification only when the white list of the UE 100 is reliable.

However, when the CSG verification using the path switch request is failed, the RRC connection between the UE 100 and the HeNB 400 is disconnected and communication is stopped similarly to the cases 1 and 2.

(3.2) Operation Pattern According to Embodiment

Next, the operation pattern 1 to the operation pattern 3 according to the embodiment will be described.

The operation pattern 1 to the operation pattern 3 according to the embodiment are common in that in response to the reception of the CSG verification failure information (CSG Query Nack) from the MME 300, the HeNB 400 starts the re-handover procedure of the UE 100 to another cell from the CSG cell while maintaining the RRC connection to the UE 100.

However, the operation pattern 1 to the operation pattern 3 according to the embodiment have different methods for acquiring a measurement report for determining a target cell in the re-handover procedure.

(3.2.1) Operation Pattern 1

Figure 12:
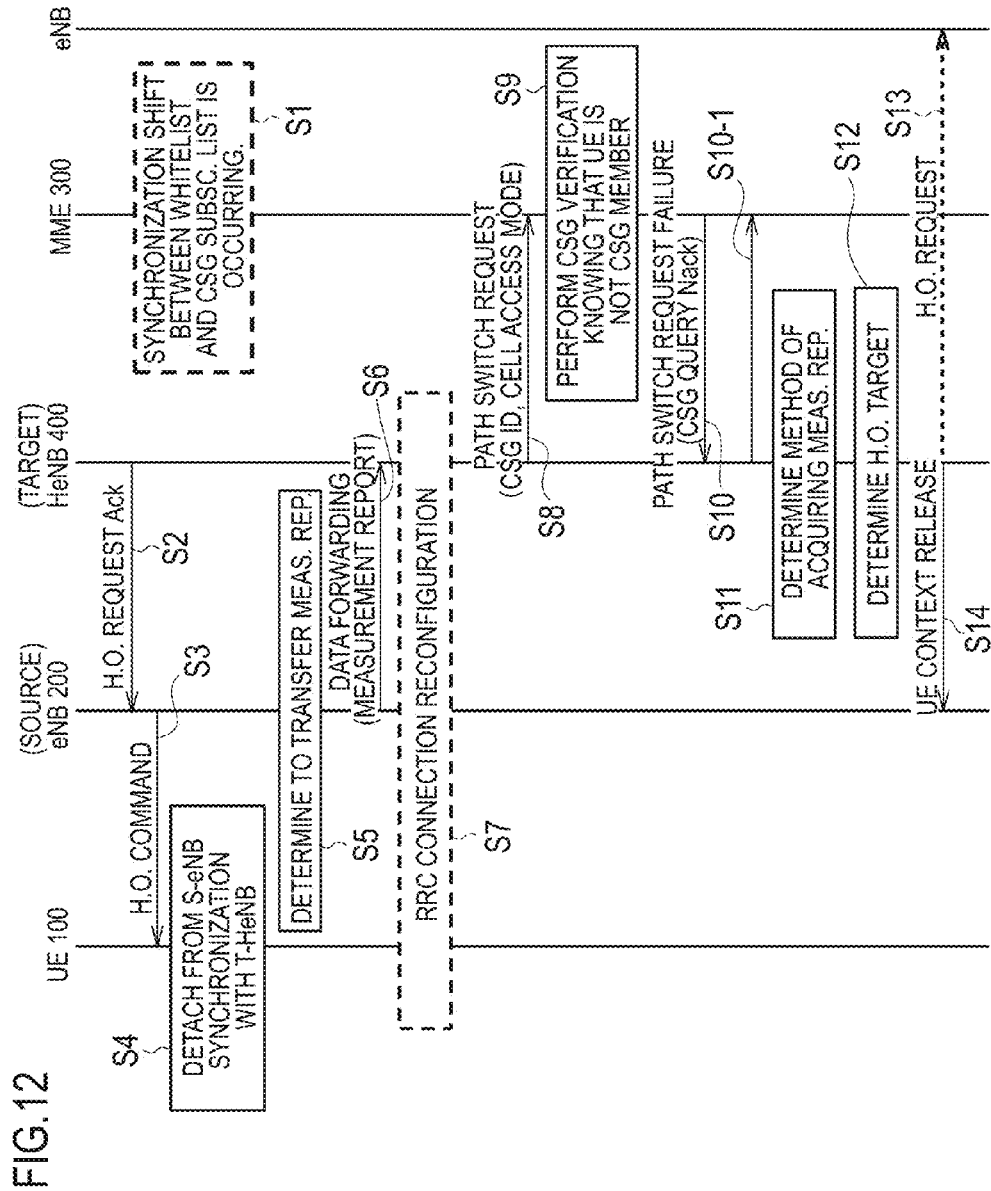
FIG. 12 is a sequence diagram of an operation pattern 1 according to an embodiment.

FIG. 12 is a sequence diagram of the operation pattern 1 according to the embodiment. The present sequence shows an operation after the eNB 200 transmits a handover request to the HeNB 400 and the HeNB 400 determines to permit the handover request. Furthermore, in an initial state of the present sequence, it is assumed that synchronization shift occurs between the white list of the UE 100 and the CSG subscriber information of the MME 300 (step S1).

As illustrated in FIG. 12, in step S2, the HeNB 400 transmits a positive response (H.O. Request Ack) for the handover request from the eNB 200 to the eNB 200 through the X2 interface.

In step S3, the eNB 200 transmits a handover command (H.O. Command) to the CSG cell of the HeNB 400 to the UE 100 in response to the positive response (H.O. Request Ack) from the HeNB 400.

In step S4, the UE 100 disconnects an RRC connection to the eNB 200 in response to the handover command from the eNB 200, and starts a process for establishing an RRC connection to the CSG cell of the HeNB 400.

In step S5, the eNB 200 determines whether to transfer a measurement report from the UE 100 to the HeNB 400. Hereinafter, a description will be given on the assumption that it is determined to transfer the measurement report from the UE 100 to the HeNB 400. In addition, details of the determination process (the step S5) will be described later.

In step S6, the eNB 200 transfers (forwards) non-transmitted data, which is directed to the UE 100, to the HeNB 400 through the X2 interface. Furthermore, at the time of the forwarding, the eNB 200 transmits a measurement report (a transfer measurement report) to the HeNB 400 through the X2 interface. In addition, the measurement report (the transfer measurement report) includes a received signal state (RSRP and/or RSRQ) measured by the UE 100 for at least one cell, and an identifier of the cell.

In step S7, the UE 100 establishes the RRC connection to the CSG cell of the HeNB 400.

In step S8, the HeNB 400 transmits a path switch request to the MME 300 through the S1 interface. The path switch request includes CSG ID and a cell access mode.

In step S9, the MME 300 performs CSG verification of the UE 100 on the basis of the path switch request from the HeNB 400. Since it is determined that the UE 100 is not the member of the CSG cell of the HeNB 400, the CSG verification is failed.

In step S10, the MME 300 transmits a negative response (Path Switch Request Failure) for the path switch request from the HeNB 400 to the HeNB 400 through the S1 interface. The negative response includes CSG verification failure information (CSG Query Nack).

In step S10-1, in response to the reception of the Path Switch Request Failure including CSG Query Nack, the HeNB 400 transmits a withholding request of the detach of the UE 100 to the MME 300 through the S1 interface. The MME 300 withholds the detach of the UE 100 in response to the reception of the withholding request.

In step S11, the HeNB 400 starts a handover procedure of the UE 100 to another cell in response to the reception of the CSG verification failure information (CSG Query Nack) from the MME 300. The HeNB 400 determines an acquisition method of the measurement report from the UE 100. In addition, details of the determination process (the step S11) will be described later. Hereinafter, a description will be given on the assumption that the transfer measurement report obtained through the forwarding (the step S6) in the handover procedure is acquired.

In step S12, the HeNB 400 determines a target cell in a re-handover procedure on the basis of the transfer measurement report obtained through the forwarding (the step S6). Hereinafter, a description will be given on the assumption that a cell, other than the cell of the eNB 200, is determined as the target cell. In addition, details of the determination process (the step S12) will be described later.

In step S13, the HeNB 400 transmits a handover request to the target cell (target eNB) determined in the step S12. Furthermore, in the step S14, the HeNB 400 notifies the eNB 200 of resource release (UE context release) for the UE 100. Then, a normal handover procedure (a re-handover procedure) is performed.

(3.2.2) Operation Pattern 2

Figure 13:
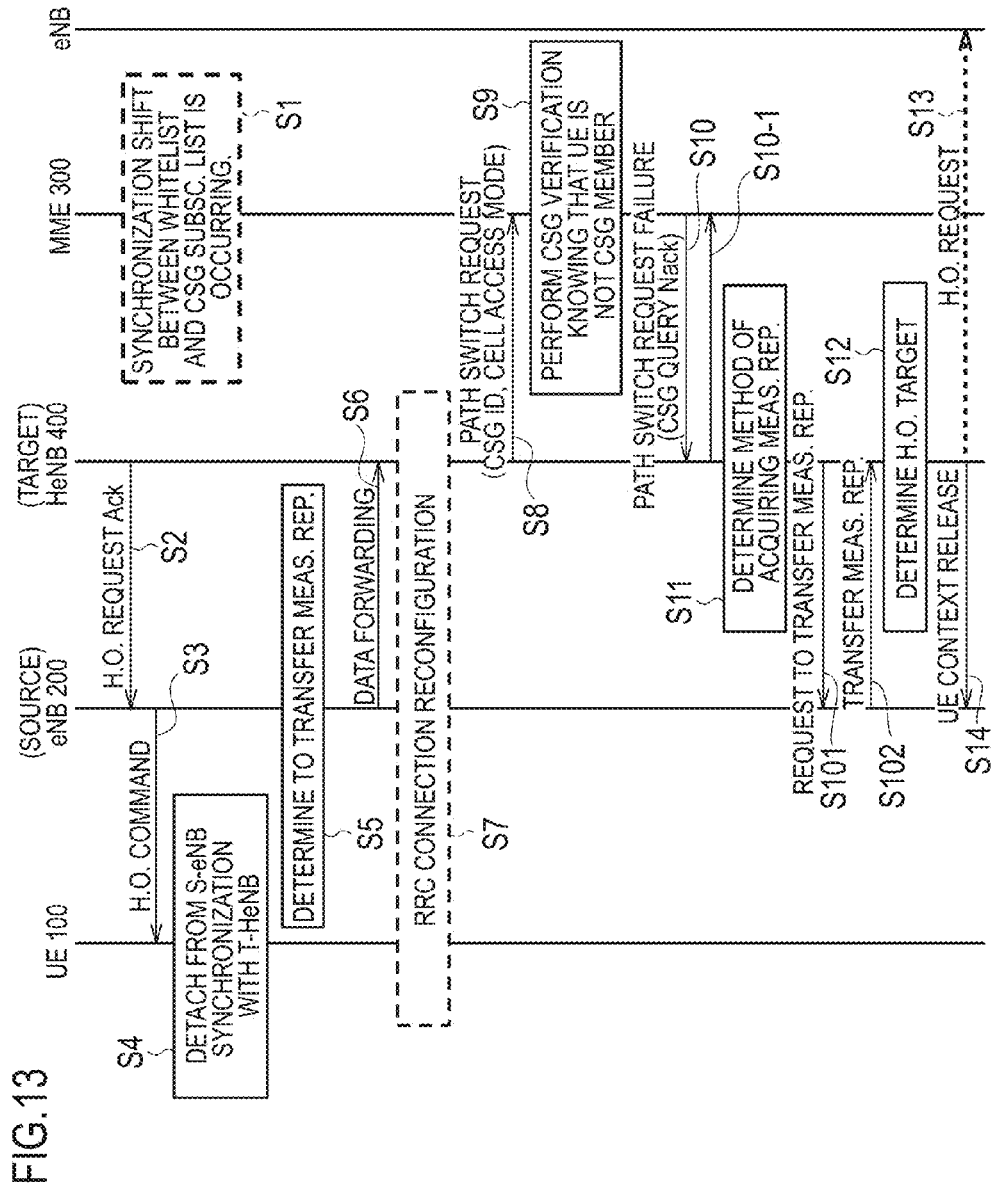
FIG. 13 is a sequence diagram of an operation pattern 2 according to the embodiment.

FIG. 13 is a sequence diagram of the operation pattern 2 according to the embodiment. Mainly, the differences from the operation pattern 1 will be described, below.

As illustrated in FIG. 13, the operation pattern 2 is different from the operation pattern 1 in that no measurement report (no transfer measurement report) is transmitted to the HeNB 400 in forwarding (step S6).

Furthermore, the operation pattern 2 is different from the operation pattern 1 in that after the CSG verification failure information (CSG Query Nack) is received from the MME 300 (step S10), the HeNB 400 requests the eNB 200 to transmit the transfer measurement report through the X2 interface (step S101) before determining the target cell (step S12). The eNB 200 transmits the transfer measurement report to the HeNB 400 through the X2 interface in response to the request of the HeNB 400 (step S102).

(3.2.3) Operation Pattern 3

Figure 14:
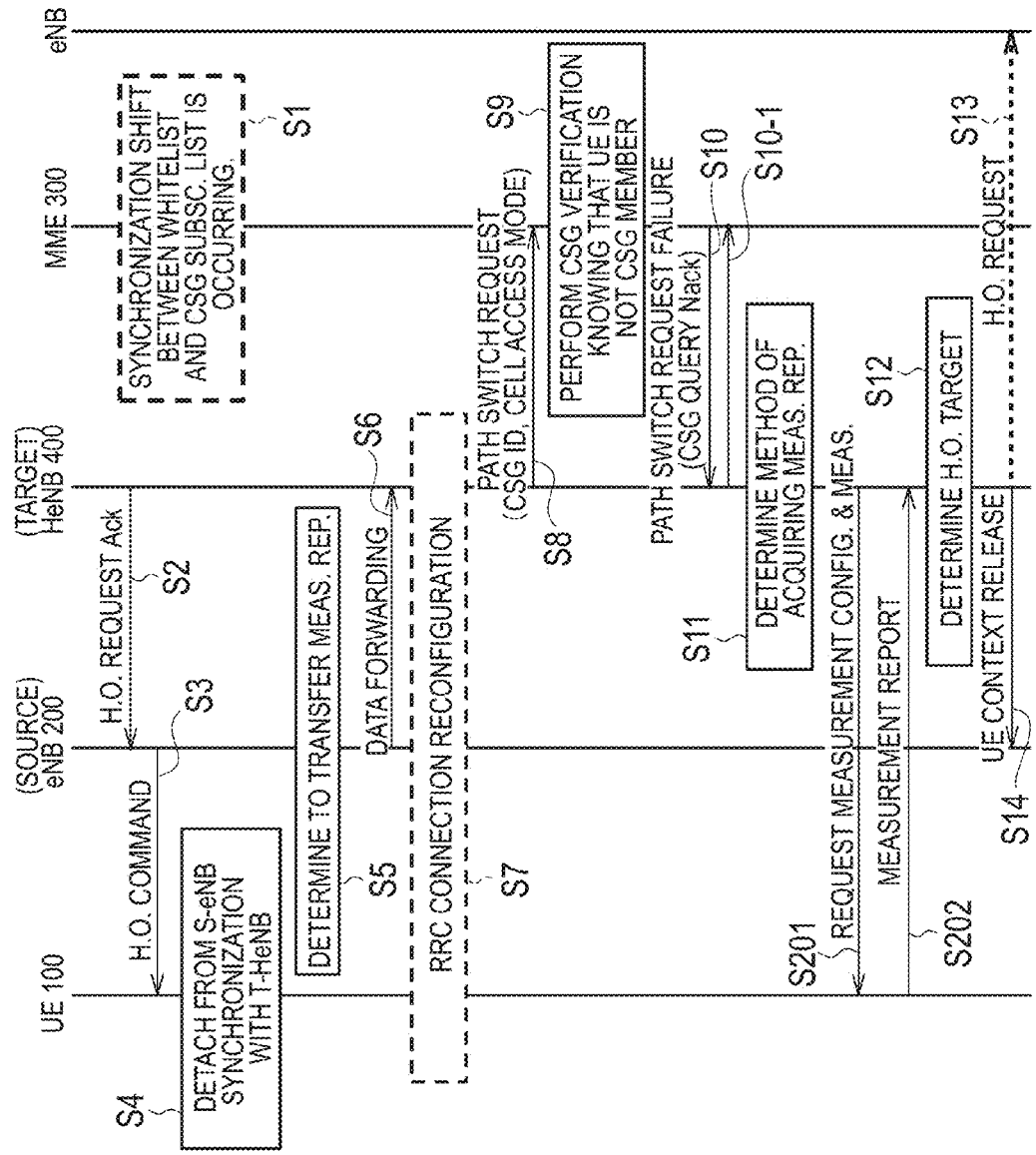
FIG. 14 is a sequence diagram of an operation pattern 3 according to the embodiment.

FIG. 14 is a sequence diagram of the operation pattern 3 according to the embodiment. Mainly, the differences from the operation patterns 1 and 2 will be described, below.

As illustrated in FIG. 14, the operation pattern 3 is different from the operation patterns 1 and 2 in that the HeNB 400 acquires the transfer measurement report from the UE 100 rather than from the eNB 200.

Specifically, after the CSG verification failure information (CSG Query Nack) is received from the MME 300 (step S10), the HeNB 400 transmits a transmission request (Measurement Configuration) of a measurement report to the UE 100 (step S201) before determining the target cell (step S12). The UE 100 transmits the measurement report to the HeNB 400 in response to the request of the HeNB 400 (step S202).

(3.3) Process Flow According to Embodiment

Next, detailed examples of processes in the operation pattern 1 to the operation pattern 3 according to the embodiment will be described.

(3.3.1) Transfer Determination Process Flow of Measurement Report

FIG. 15 is a flowchart illustrating a transfer determination process of a measurement report, that is, a detailed process of the aforementioned step S5 (refer to FIG. 12 to FIG. 14).

As illustrated in FIG. 15, in step S51, the eNB 200 receives a handover response (H.O. Request Ack) from the HeNB 400.

In step S52, the eNB 200 confirms whether a target cell (a cell of the HeNB 400) has CSG ID on the basis of a measurement report (Measurement Report) from the UE 100. When the target cell has no CSG ID (the step S52; Yes), the eNB 200 determines not to transfer the measurement report (step S53).

When the target cell has the CSG ID (the step S52; No), the eNB 200 confirms whether CSG Indication of the target cell is False on the basis of the measurement report (Measurement Report) from the UE 100 in step S54. When the CSG Indication of the target cell is False (the step S54; Yes), the eNB 200 determines not to transfer the measurement report (the step S53). In addition, a cell having the CSG ID and the CSG Indication of False corresponds to a hybrid cell.

When the CSG Indication of the target cell is True (the step S54; No), that is, when the target cell is a CSG cell (is in a closed mode), the eNB 200 confirms whether verification success information (CSG Query Ack) has been obtained from the MME 300 in step S55. When the verification success information has been obtained from the MME 300 (the step S55; Yes), the eNB 200 determines not to transfer the measurement report (the step S53).

When the verification success information has not been obtained from the MME 300 (the step S55; No), the eNB 200 confirms whether pre-verification has been performed in step S56. The pre-verification includes verification using a white list, verification using CSG subscriber information (CSG Subscription Data) copied from the MME 300, or a method for verifying the target cell in advance. When the pre-verification has been performed (the step S56; Yes), the eNB 200 determines not to transfer the measurement report (the step S53).

When the pre-verification has not been performed (the step S56; No), the eNB 200 confirms whether a movement speed of the UE 100 exceeds a threshold value in step S57. When the movement speed of the UE 100 exceeds the threshold value (the step S57; Yes), the eNB 200 determines not to transfer the measurement report (the step S53).

When the movement speed of the UE 100 is equal to less than the threshold value (the step S57; No), the eNB 200 determines to transfer the measurement report (step S58).

In addition, in relation to the determination steps of the step S52, the step S54, the step S55, the step S56, and the step S57 in the present flow, as well as the case in which all the steps are performed, only a part of the steps may be performed.

(3.3.2) Acquisition Method Determination Process Flow of Measurement Report

FIG. 16 is a flowchart illustrating an acquisition method determination process of a measurement report, that is, a detailed process of the aforementioned step S11 (refer to FIG. 12 to FIG. 14).

As illustrated in FIG. 16, in step S111, the HeNB 400 receives verification failure information (CSG Query Nack) from the MME 300.

In step S112, the HeNB 400 confirms whether a transfer measurement report has been received from the eNB 200. When the transfer measurement report has been received from the eNB 200 (the step S112; Yes), the HeNB 400 determines to use the received transfer measurement report (step S113).

When the transfer measurement report has not been received from the eNB 200 (the step S112; No), the HeNB 400 confirms whether a movement speed of the UE 100 exceeds a threshold value in step S114. When the movement speed of the UE 100 exceeds the threshold value (the step S114; Yes), the eNB 200 determines to request the eNB 200 to transfer the measurement report (step S115).

When the movement speed of the UE 100 is equal to less than the threshold value (step S114; No), the eNB 200 determines to request the UE 100 to transmit the measurement report (step S116).

In addition to the determination (the step S114) based on the movement speed, in consideration of QoS of communication with the UE 100, when the QoS is high, it may be possible to determine to request the UE 100 to transmit the measurement report. Furthermore, in consideration of an elapsed time period of the transfer measurement report, when the elapsed time period is long, it may be possible to determine to request the UE 100 to transmit the measurement report.

(3.3.3) Determination Process Flow of Target Cell

FIG. 17 is a flowchart illustrating a determination process of a target cell, that is, a detailed process of the aforementioned step S12 (refer to FIG. 12 to FIG. 14). In addition, in the operation pattern 3, since it is possible to determine the target cell using a normal method, the determination process of the target cell in the operation patterns 1 and 2 will be described below.

In step S121, the HeNB 400 selects a cell (eNB) corresponding to measurement information with the second highest communication quality (RSRP/RSRQ) from measurement information included in the transfer measurement report. In the transfer measurement report, since a cell of the HeNB 400 is considered to have the highest communication quality (RSRP/RSRQ), it is set as "the second highest".

In step S122, the HeNB 400 confirms whether the cell selected in the step S121 has the CSG ID. When the cell selected in the step S121 has no CSG ID (the step S122; Yes), the HeNB 400 selects the cell as the target cell (step S123).

When the cell selected in the step S121 has the CSG ID (the step S122; No), the HeNB 400 confirms whether CSG Indication of the cell is False on the basis of the transfer measurement report in step S124. When the CSG Indication of the cell is False (the step S124; Yes), the HeNB 400 selects the cell as the target cell (the step S123). In addition, a cell having the CSG ID and the CSG Indication of False corresponds to a hybrid cell.

When the CSG Indication of the cell is True (the step S124; No), that is, when the cell is a CSG cell (is in a closed mode), in step S125, the HeNB 400 extracts measurement information corresponding to a cell having no CSG ID from among the measurement information items with third and lower highest communication qualities (RSRP/RSRQ), included in the transfer measurement report, and designates the highest communication quality (RSRP/RSRQ) from thereamong. Then, the HeNB 400 confirms whether the difference between the second highest communication quality (RSRP/RSRQ) and the designated communication quality (RSRP/RSRQ) exceeds a threshold value.

When the difference exceeds the threshold value, the HeNB 400 selects the cell (the cell corresponding to the measurement information with the second highest communication quality (RSRP/RSRQ)), which is selected in the step S121, as the target cell (the step S123).

On the other hand, when the difference is equal to or less than the threshold value, the HeNB 400 selects a cell (that is, a cell used in the comparison), which corresponds to the designated communication quality (RSRP/RSRQ), as the target cell (step S126).

In addition to the present flow, the target cell may be determined as follows. For example, since the eNB 200 (a source cell) holds setting information (context) of the UE 100, the source cell may be preferentially selected as the target cell. Alternatively, a macro cell may be preferentially selected as the target cell.

(4) Conclusion of Embodiment

As described above, after the UE 100 establishes an RRC connection to the CSG cell in the handover procedure, when CSG verification is failed, the MME 300 transmits CSG verification failure information (CSG Query Nack) indicating the failure of the CSG verification to the HeNB 400. The HeNB 400 starts the re-handover procedure of the UE 100 to another cell from the CSG cell while maintaining the RRC connection to the UE 100 in response to the reception of the CSG verification failure information from the MME 300.

In this way, even when the UE 100 establishes the RRC connection to the CSG cell, for which the UE 100 has no access permission, in the handover procedure, the re-handover procedure of the UE 100 to another cell from the specific cell is started while maintaining the RRC connection, so that it is possible to prevent communication interruption from occurring in the UE 100.

In the operation patterns 1 and 2 according to the embodiment, the eNB 200 transfers at least a part of the measurement report of the UE 100 to the HeNB 400. The HeNB 400 determines the target cell in the re-handover procedure on the basis of the transfer measurement report from the eNB 200.

In this way, it is possible to quickly determine the target cell in the re-handover procedure.

In the operation pattern 3 according to the embodiment, the HeNB 400 determines the target cell in the re-handover procedure on the basis of the measurement report from the UE 100.

As described above, when the reliability of the transfer measurement report is low (when the UE 100 moves at a high speed or when an elapsed time period of the transfer measurement report is long), the measurement report from the UE 100 is used instead of the transfer measurement report, so that it is possible to appropriately determine the target cell.

[Other Embodiments]

Thus, the present disclosure has been described with the embodiment and modified examples. However, it should not be understood that those descriptions and drawings constituting a part of the present disclosure limit the present disclosure.

For example, the aforementioned operation patterns 1 to 3 may be performed through a combination thereof.

In the aforementioned operation pattern 1, the example, in which the measurement report is transferred from the eNB 200 to the HeNB 400 at the time of data forwarding in the handover procedure, is described. However, as well as at the time of the data forwarding, the measurement report may be transferred from the eNB 200 to the HeNB 400 at the time of the handover request (H.O. Request).

In addition, the entire content of U.S. Provisional Application No. 61/612,055 (filed on Mar. 16, 2012) is incorporated in the present specification by reference.

INDUSTRIAL APPLICABILITY

As described above, a communication control method, a mobility management device, a home base station, and a base station according to the present disclosure can appropriately cope with a case in which a user terminal is erroneously handed over to a specific cell for which the user terminal has no access permission.

The invention claimed is:

1. A base station that forms a serving cell of a user terminal in a mobile communication system including a mobility management apparatus, comprising:
   a receiver configured to receive a measurement report from the user terminal;
   a controller configured to initiate a cell setting procedure in which a Closed Subscriber Group (CSG) cell formed by a home base station is set as a new serving cell of the user terminal, wherein, in the cell setting procedure, the mobility management apparatus verifies whether the user terminal is a member of the CSG cell; and
   a transmitter configured to transmit measurement information to the home base station, the measurement information being at least a part of the measurement report from the user terminal, wherein
   the controller is further configured to cause the transmitter to transmit a cell setting request message to the home base station to initiate the cell setting procedure, the cell setting request message requesting the home base station to set the CSG cell as the new serving cell,
   the transmitter is further configured to transmit the measurement information together with the cell setting request message to the home base station, and
   the measurement information includes an identifier of the CSG cell and measurement results associated to the CSG cell, the measurement results including Reference Signal Received Power (RSRP) associated to the CSG cell and/or Reference Signal Received Quality (RSRQ) associated to the CSG cell.

2. An apparatus to be provided in a base station that forms a serving cell of a user terminal in a mobile communication system including a mobility management apparatus, comprising:
   at least one processor and at least one memory, the at least one processor being configured to
      receive a measurement report from the user terminal;
      initiate a cell setting procedure in which a Closed Subscriber Group (CSG) cell formed by a home base station is set as a new serving cell of the user terminal, wherein, in the cell setting procedure, the mobility management apparatus verifies whether the user terminal is a member of the CSG cell;

transmit a cell setting request message to the home base station to initiate the cell setting procedure, the cell setting request message requesting the home base station to set the CSG cell as the new serving cell; and transmit measurement information to the home base station together with the cell setting request message, the measurement information being at least a part of the measurement report from the user terminal, wherein the measurement information includes an identifier of the CSG cell and measurement results associated to the CSG cell, the measurement results including Reference Signal Received Power (RSRP) associated to the CSG cell and/or Reference Signal Received Quality (RSRQ) associated to the CSG cell.

3. A communication control method applied to a base station that forms a serving cell of a user terminal in a mobile communication system including a mobility management apparatus, comprising:

receiving a measurement report from the user terminal;

initiating a cell setting procedure in which a Closed Subscriber Group (CSG) cell formed by a home base station is set as a new serving cell of the user terminal, wherein, in the cell setting procedure, the mobility management apparatus verifies whether the user terminal is a member of the CSG cell;

transmitting a cell setting request message to the home base station to initiate the cell setting procedure, the cell setting request message requesting the home base station to set the CSG cell as the new serving cell; and transmitting, measurement information to the home base station together with the cell setting request message, the measurement information being at least a part of the measurement report from the user terminal, wherein the measurement information includes an identifier of the CSG cell and measurement results associated to the CSG cell, the measurement results including Reference Signal Received Power (RSRP) associated to the CSG cell and/or Reference Signal Received Quality (RSRQ) associated to the CSG cell.

* * * * *